Sept. 21, 1965     R. S. BUTLER     3,207,306

MINING APPARATUS

Filed Oct. 2, 1962

INVENTOR.
ROBERT S. BUTLER

BY

Elliott & Pastoriza
ATTORNEYS

United States Patent Office 3,207,306
Patented Sept. 21, 1965

3,207,306
MINING APPARATUS
Robert S. Butler, 9952 Robbins Drive,
Beverly Hills, Calif.
Filed Oct. 2, 1962, Ser. No. 227,835
4 Claims. (Cl. 209—11)

This invention relates generally to an apparatus for mining and more particularly to a dry concentration method and apparatus for separating heavier metals and minerals from earth material.

Conventional mining for separating or concentrating various metals and minerals is carried out with large quantities of water. The water serves as a carrier and washing medium for the earth material. In desert country, however, the lack of water has necessitated mining by dry concentration methods. Generally, the materials are simply subjected to a series of manual straining operations. These operations are not only time consuming, but the resulting concentrate is not as pure or clean as results from wet concentration methods.

As a consequence, an alternative practice has been to transport large quantities of earth material to a site at which water is available. Since the recovered metals and minerals are only a small percent of the original earth material, however, the equipment and time involved in transportation can be extremely costly. Even if a rough screening operation is performed on the desert and the separated material only transported for further refinement, costs can be high.

With the foregoing in mind, it is a primary object of this invention to provide an improved apparatus for dry concentration of earth material so that mining operations can be carried on in the desert without water.

More particularly, it is an object to provide an improved automatic power driven apparatus for mining earth material to separate out heavier particles from lighter particles in which the particles themselves are clean and substantially moisture free and in which large quantities of earth material are automatically treated so that considerable savings in time and labor are realized.

Other objects of the invention are to provide an improved apparatus in which various steps in the mining process can be combined so that several functions are carried out simultaneously to the end that a more economical apparatus for dry concentration results.

In the preferred apparatus for carrying out the invention, there is provided a frame structure incorporating a mechanical raising means for initially raising the earth material to be mined to a given height. A coarse screening structure in the shape of a chute is then provided for receiving the material and feeding it through a cylindrically shaped trommel. This trommel in turn has a fine screen structure in its cylindrical walls so that small particles dropped in through the coarse screen will strike the inner wall surface of the trommel and result in smaller particles passing from the lower end of the trommel. Coarser particles migrate out the end of the cylindrically shaped trommel and are disposed of along with larger particles from the course screening operation.

A source of high velocity heated gas is provided in a conduit including a first venturi section disposed beneath the trommel. Preferably, the heated gas is derived directly from a power diesel engine for providing power for the various conveyors and rotation of the trommel itself. The action of the first venturi is to draw in the particles from the trommel and raise them to their initial height. In this action, a scrubbing of the particles takes place and dust therefrom is blown free. The latter operation of blowing the dust from the particles takes place in a first dust collector device supported on the frame.

From the first dust collector device, the particles are then passed through a magnetic separator and thence into a second venturi section to pass into a second high velocity heated gas stream which will again raise the particles to a second dust collector and substantially eliminate any surface moisture.

Finally, the particles are dropped onto a table including an inclined surface. This table is subject to air pressure pulsations to bounce the particles thereon so that the lighter particles will tend to migrate towards the lower end of the inclined table and be disposed of and the heavier particles pass over the upper end into a suitable collecting means.

By employing a high velocity gas stream to both clean the particles, remove moisture therefrom and raise the particles, much of the equipment heretofore deemed necessary in an automatic dry concentration system has been eliminated. As a consequence, the entire structure may be made relatively compact and portable. Moreover, the final concentrate is in a pure and more concentrated form than is normally realized by manual means.

A better understanding of the apparatus will be had by now referring to a preferred embodiment thereof as illustrated in the accompanying drawings, in which.

Figure 1:
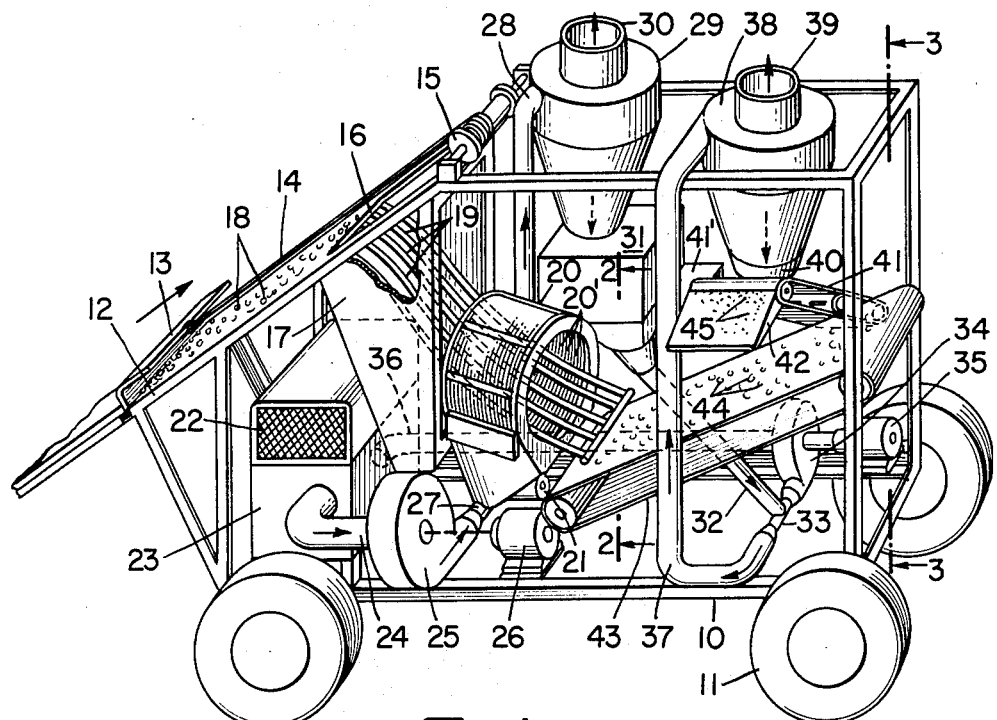
FIGURE 1 is a schematic perspective view of one apparatus in accordance with the invention for carrying out the method.

Referring first to FIGURE 1, there is shown a supporting frame 10 preferably mounted on wheels such as indicated at 11 so that the frame may be transported over the desert. As shown at the left hand portion of the frame, there is provided an elongated sloping ramp 12, the extreme outer end of which is in engagement with the earth (not shown). Cooperating with the ramp 12 is a scraper 13 adapted to pull earth material up the ramp 12 as by a cable 14 operating from a winch 15. The ramp 12 includes an opening 16 in its upper end and a hopper 17 disposed beneath the opening 16. With this arrangement, a given quantity of earth material 18 is scraped up by the scraper 13 and pulled up the ramp 12 by means of the winch 15 to fall through the opening 16 into the hopper 17.

A coarse screen comprising side-by-side rods 19 formed into a chute structure has one end within the hopper 17 upon which the gravel or earth material 18 initially falls. This chute structure passes from the hopper 17 through a trommel 20 of cylindrical shape. The trommel 20 provides a fine screening of the particles, and towards this end, is provided with a series of closely spaced circumferentially positioned wires 20'. The axis of the cylindrically shaped trommel is inclined as shown with the other end of the coarse screen chute structure 19 passing therefrom. The arrangement is such that larger particles will simply roll off the free end of the coarse screen chute structure 19 and small particles will drop between the various rods onto the inside surface of the trommel 20. The trommel is arranged to be rotated very slowly as by a suitable motor 21 so that smaller particles will be passed through the cylindrical walls of the trommel.

Positioned on the left of the frame structure 10 beneath the ramp 12 is a diesel engine or equivalent internal combustion engine 22. Hot gases from this engine as from the exhaust are passed into a heat exchanger 23 having an outlet conduit 24 passing to a first blower 25 powered by an electric motor 26. This blower passes a high velocity heated gas stream through an outlet conduit including a first venturi section 27 positioned beneath the trommel 20. This venturi section is in communication with the trommel as shown and will draw in the smaller particles passed through the walls of the trommel. These particles are passed up the other side of the venturi in conduit 28 to a first dust collector 29 having an upper flute opening 30.

From the first dust separator 29, the particles pass downwardly through a magnetic separator indicated by the box 31 and thence through an outlet conduit 32 to a second venturi section 33. A high velocity stream of hot gases is passed through this venturi section by a blower 34 powered by a motor 35 and receiving heated gas through a conduit 36 connected to the heat exchanger 23 on the far side.

The non-magnetic particles are thus drawn into this second venturi section by the gas stream and pass up a conduit 37 to a second dust collector 38 having an overhead outlet opening 39.

Finally, the particles from the dust collector 38 pass down an outlet 40 onto a table 41 in the form of an inclined moving surface powered by a motor 41'. The higher or front end of this inclined surface terminates in a sloping ramp 42 from which the desired concentrated particles are collected.

The apparatus is completed by a larger ramp in the form of a conveyor 43 disposed beneath the table 41 so as to receive particles falling over the rear or lower edge of the table 41. This conveyor 43 also receives the larger particles from the coase screen structure 19 passing out of the trommel 2. In addition, the conveyor 43 receives particles from the trommel itself that are too large to pass through the circumferential screening of the trommel, the angulation of the axis of the trommel being so directed as to cause these particles to feed onto the conveyor 43 as the trommel is slowly rotated. The conveyor 43 moves the various particles as indicated at 44 that are screened out from the desired particles and disposes of them at the right hand or rear of the frame structure. The heavier particles that are screened from the table 41 are shown on the ramp 42 at 45.

Figures 2, 3, 4:
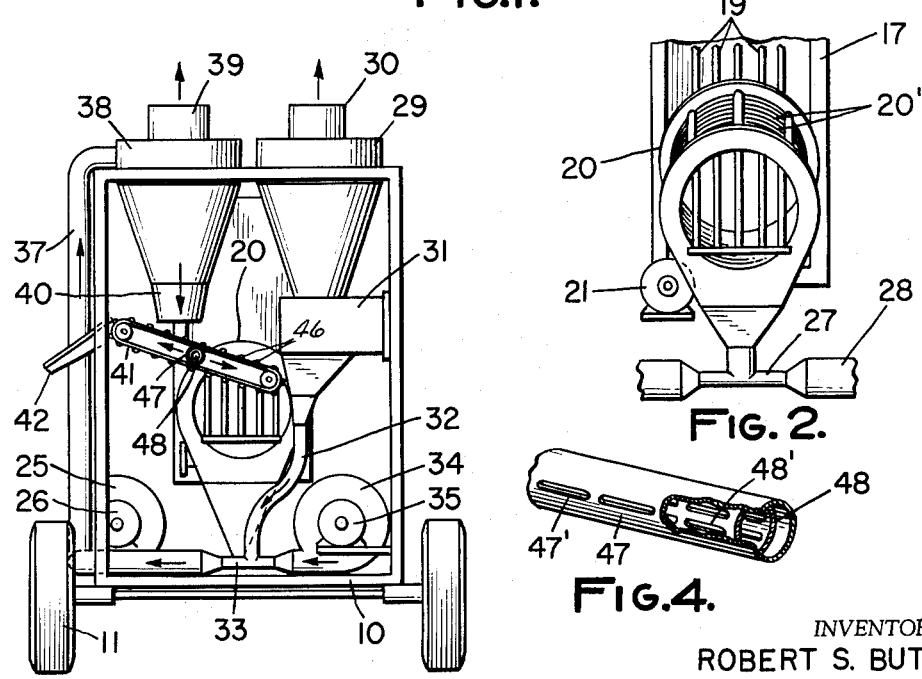
FIGURE 2 is a fragmentary view taken in the direction of the arrows 2—2 of FIGURE 1.
FIGURE 3 is an end view taken in the direction of the arrows 3—3 of FIGURE 1; and, FIGURE 4 is a fragmentary perspective view illustrating components used in the apparatus of FIGURE 1.

Referring now to FIGURE 2, the geometrical positioning of the first venturi section 27 will be clearer wherein it will be noted that particles passed from the circumferential screening of the trommel 20 will be guided directly into the venturi section.

In FIGURE 3, the details of the table 41 may better be understood wherein it will be noted that there is provided a series of transverse riffles 46. Between the upper and lower surfaces of the belt forming the moving surface portion of the table, there is transversely disposed coaxial or telescoping tubes 47 and 48. The inner tube 48 is arranged to be rotated by the motor 41' and to have air blown therein to provide a pulsating air flow. With this arrangement, pulsating air is caused to extend from either side of the outer tube 47 to cause various particles dropped on the top surface of the table to be bounced or blown upwardly. With this arrangement, the lighter particles will tend to migrate towards the lower end of the table and fall off this lower end onto the disposing conveyor 43. The heavier particles, on the other hand, will be held against the table by the riffles 46 and thus be fed to the ramp 42 to be collected.

FIGURE 4 shows in detail the telescoping tubes 47 and 48 wherein it will be noted that the outer tube 47 includes diametrically opposite slots 47' for directing air between the upper and lower belts forming the table 41. The inner tube 48 on the other hand includes lateral slots 48' and as a consequence of the rotation of this tube as indicated by the arrow, the pulsating effect will be achieved when the slots 48' come into registration with the slots 47'.

The overall operation of the apparatus will be evident from the foregoing description. As stated, earth material is initially raised to a given level by the scraper 13 in cooperation with the front ramp 12. These particles will then fall through the opening 16 onto the coarse screening comprising the rods 19 defining the chute structure. The larger of these particles will pass off the free end of the coarse screening 19 onto the disposing conveyor 43 and the small particles will pass through the coarse screening into the trommel 20 as described heretofore.

With the trommel 20 rotating very slowly, for example, four or five revolutions per minute, the particles will be shaken about and smaller particles will pass through the circumferential walls of the trommel and be sucked into the first venturi section 27. The other particles will migrate from the end of the trommel onto the disposing conveyor 43. The action of the high velocity hot gas stream on the particles is two-fold. First, the gas stream will serve to raise all of these particles to a high level and simultaneously serve to "scrub" the particles. Thus, foreign material will be broken away from the particles.

The particles are fed into the first dust collector 29 tangentially, and they will be swirled about within the dust collector 29, the dust itself being blown free of the particles and out the upper flute 30. The particles themselves will then pass through the magnetic separator 31 and the non-magnetic particles will then pass through the outlet conduit 32. The magnetic particles such as magnetite, in turn, will be retained within the separator 31.

When the non-magnetic particles reach the second venturi 33, the high velocity second hot gas stream serves again a dual function. First, the gas stream will raise the particles up to the second dust collector 38 and also will remove last remnants of surface moisture on the particles. Further, any additional dust that was not removed in the dust collector 29 will be removed in the dust collector 38. The particles are thus relatively clean and dry and thus easily separable when they drop onto the table 41 from the outlet 40.

As described with respect to the table 41, the inclined moving surface together with the riffles 46 provides a means for separating the heavier from the lighter particles of the various particles received from the dust collector 38. Thus, the pulsating air flow will tend to bounce the particles so that the lighter particles will bounce over the riffles and eventually migrate towards the lower end of the table to fall onto the disposing conveyor 43. The heavier particles 45 such as gold, silver, etc., will be trapped by the riffles 46 and fed to the output ramp 42 to any suitable collecting means.

From the foregoing description, it will thus be evident that the present invention has provided a greatly improved and simplified dry concentration mining apparatus. The provision of the hot air stream derived from heat generated by the diesel engine is an important and novel feature of this invention. As stated, these hot air streams served dual functions in raising the material, thereby eliminating the need for auxiliary mechanical type elevators, as well as "scrubbing" and removing moisture from the particles. Further, the provision of the coarse screening structure inside the cylindrically shaped trommel enables a compact arrangement to be realized to the end that an efficient and portable mining apparatus is provided.

While only one particular embodiment of the apparatus has been shown and described, it will be evident that various different types of apparatus could be employed.

What is claimed is:

1. An apparatus for concentrating heavy particles from earth material comprising, in combination: a frame; raising means for raising said earth material to the upper portion of said frame at a given level above the ground; a hopper mounted below said level in a position to receive said earth material; an elongated coarse screen structure in the shape of an inclined chute having one end in said hopper to receive said material and its other end passing from said hopper; a fine screen trommel in the form of a cylinder surrounding said other end portion of said chute with its axis inclined; means for rotating said trommel so that small particles passing through said coarse screen structure are agitated on the inner surface of said trommel; a source of heated gas; a first blower means receiving said heated gas and having an output conduit to carry a high velocity stream of said heated gas; a first venturi section in said output conduit disposed beneath said trommel and in communication therewith to draw smaller particles passed to said trommel into said first high velocity gas stream, said conduit passing upwardly in said frame to terminate in a first dust collector, said smaller particles being scrubbed and raised by said gas stream and dust being blow free of said particles in said dust collector; a magnetic separating means positioned to receive particles from said first dust collector and separate them into magnetic and non-magnetic particles; an outlet conduit from said separator for receiving said non-magnetic particles; a second blower means receiving heated gas and having an output conduit to carry a high velocity gas stream; a second venturi section in said output conduit in communication with said outlet conduit from said magnetic separator to draw said non-magnetic particles into said gas stream, said conduit passing upwardly in said frame to terminate in a second dust collector, said non-magnetic particles being raised and having surface moisture removed therefrom by said heated gas stream; and an inclined moving table means disposed in said frame beneath said second dust collector for receiving particles passing therefrom, said table including air pressure pulsation generating means for blowing in a pulsating manner particles received on the inclined surface of said table so that lighter particles will migrate towards the lower end of said inclined table surface and heavier particles will be retained on said table until passed over its upper end for collection.

2. An apparatus according to claim 1, in which said raising means includes an inclined ramp and scraper means; and a winch structure for pulling said scraping means up said ramp whereby earth material may be urged up said ramp to said given level by said scraping means.

3. An apparatus according to claim 2, including an internal combustion engine for providing power, said heated gas means being derived from heat generated by said internal combustion engine.

4. An apparatus according to claim 1, in which said air pressure pulsation means comprises first and second telescoping tubes having lateral openings periodically in registration when said inner tube is rotated relative to said outer tube; and means for passing air into said inner tube and rotating said inner tube slowly to provide alternate registrations and lack of registration between said lateral openings so that said air is dispensed in pulses.

References Cited by the Examiner

UNITED STATES PATENTS

| | | | |
|---|---|---|---|
| 359,627 | 3/87 | Parmelee | 209—11 |
| 1,108,542 | 8/14 | Anderson | 209—247 |
| 1,177,981 | 4/16 | Wright | 209—40 |
| 1,283,857 | 11/18 | Meyer | 209—44 |
| 1,286,389 | 12/18 | Mullen | 209—35 |
| 1,290,895 | 1/19 | Byran | 209—12 |
| 1,301,684 | 4/19 | Goltra | 209—12 |
| 1,684,869 | 9/28 | Krueger | 209—247 |
| 2,144,671 | 1/39 | Adams | 209—470 |
| 2,343,803 | 3/44 | Rothgarn | 209—44 |

FOREIGN PATENTS

| | | |
|---|---|---|
| 28,686 | 8/30 | Australia. |
| 681,211 | 8/39 | Germany. |
| 827,263 | 1/52 | Germany. |

HARRY B. THORNTON, *Primary Examiner.*

HERBERT L. MARTIN, *Examiner.*